June 4, 1963 J. D. CREMIN 3,092,789

MICROWAVE SWITCHING CIRCUIT

Filed Sept. 30, 1960

INVENTOR
J. D. CREMIN
BY Roy M. Porter, Jr.
ATTORNEY

United States Patent Office 3,092,789

Patented June 4, 1963

3,092,789

MICROWAVE SWITCHING CIRCUIT

John D. Cremin, Brighton, Mass., assignor to Bell Telephone Laboratories, Incorporated, New York, N.Y., a corporation of New York Filed Sept. 30, 1960, Ser. No. 59,601
7 Claims. (Cl. 333—1.1)

Figure 1:
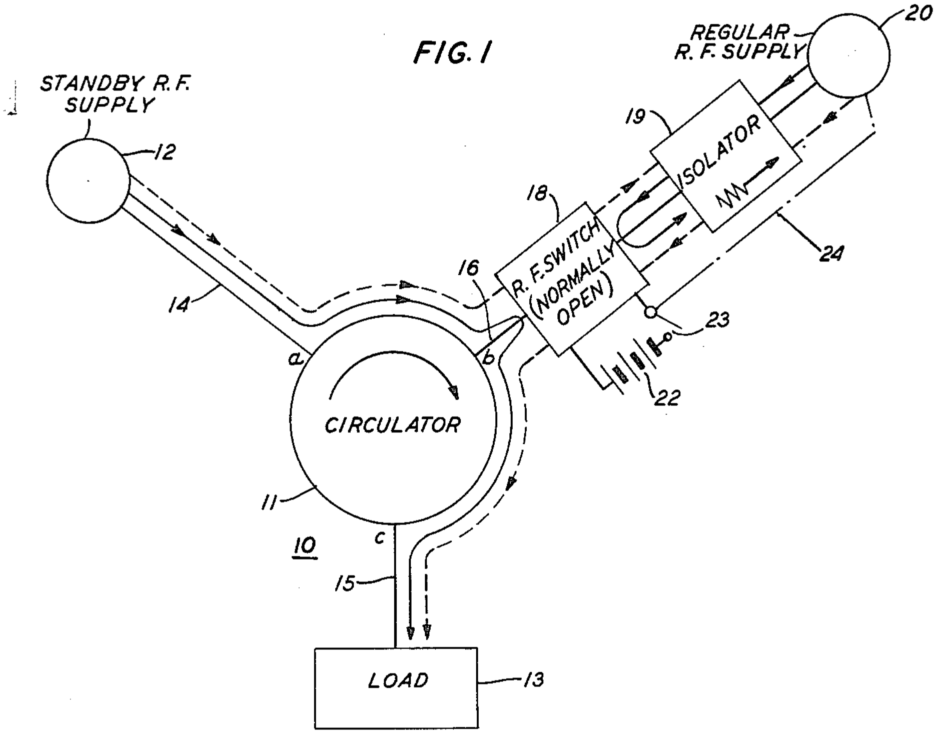

This invention relates to microwave transmission systems and, more particularly, to a microwave switching circuit for use therewith.

It is often important in broad-band, multichannel microwave systems, for example, to utilize control circuitry to switch from a common, regular radio-frequency carrier supply to a standby radio-frequency supply, should the former evidence signs of malfunctioning. Failure of the common carrier supply in such systems, if unprotected, can result in failure of many or all the broad-band and auxiliary channels in both directions of transmission. Accordingly, protecting the common carrier supply is many times more important than protecting any single microwave channel of the system.

In order to insure continuous operation with such an arrangement of carrier supplies, it is seen that a switching circuit is required which exhibits the following characteristics: During normal operating conditions, the output of the standby carrier supply must be fully absorbed while the power of the regular carrier supply must proceed through the switching circuit and into the system with a minimum of absorption. During emergency or alternate operation, the switching circuit, in response to suitable actuating circuitry capable of detecting a malfunction of the regular carrier supply, must rapidly connect the standby supply to the system while simultaneously directing the power output, if any, of the regular supply to a dissipative load for absorption.

In addition to a microwave switching circuit exhibiting the above-described characteristics, it is very important that it be much less subject to failure than the system it is designed to protect and be capable of operating under a wide range of operating conditions such as might arise from troubles in the associated equipment.

One known switching arrangement that would function in the desired manner comprises a pair of Faraday rotation switches connected in tandem, respectively, with two ferrite-controlled isolators. The two ferrite switches are synchronously operated by direct-current solenoids connected in series, one switch normally being transparent (closed) and the other switch reflective (open). Each ferrite switch-isolator pair comprises one branch of a three-branch Y junction, the third branch being connected to a desired load.

Such a switching arrangement has the advantage that it is "fail-safe," i.e., upon failure of control current to the two series-connected solenoids, the radio-frequency switch normally in the transmitting state becomes reflective whereas the switch normally in the reflecting state becomes transmitting. Thus, a loss of control current to the two solenoids does not destroy the ability of the switching arrangement to interchange the two radio-frequency supplies connected to any operating system and dissipative load, respectively.

By utilizing a separate isolator between each radio-frequency supply and the load in the above-described manner, such a switching circuit also prevents "frequency pulling" of either supply by any "long-line effect."

Disadvantageously, however, the need for synchronous switching of two control elements in the described prior art switching arrangement and the relatively high inductive portion of the time constant which results from the series-connected solenoids impairs the otherwise realized responsiveness or switching time of such an arrangement. Moreover, the necessity of multiple control elements and isolators, from a reliability standpoint as well as from an economy standpoint, leaves much to be desired.

Accordingly, it is an object of this invention to provide an improved fast-acting microwave switching circuit capable of rapidly connecting either of two radio-frequency supplies alternately to a common load or system while simultaneously absorbing the energy of the other supply through the actuation of only one circuit control element.

It is a further object of this invention to minimize the switching time, the number of components required and the chances of malfunctioning in a "fail-safe," radio-frequency switching circuit designed to function as in the aforementioned object.

In accordance with the invention, the microwave switching circuit in one illustrative embodiment comprises a multibranch circulator with a regular and a standby supply and a usable load connected, respectively, to different branches thereof.

In accordance with a feature of the invention, a fast-acting radio-frequency switch and a ferrite isolator are interposed in that order between the circulator and the regular supply. The ferrite isolator exhibits nonreciprocal attenuation in the direction from the circulator to the regular supply. The microwave switch is of the type exhibiting two alternate switching states. In a first reciprocally transparent (closed) state the switch directs the signal energy from the regular supply to the load while simultaneously directing energy from the standby supply to the isolator for absorption therein. In the second reciprocally reflective (open) state the switch reflects energy from the regular supply back to the isolator for absorption while simultaneously directing the energy from the standby supply to the usable load. Any one of a number of different types of switch elements may be utilized as will be discussed in detail hereinafter.

With this unique switching circuit arrangement, it is seen that only one isolator is required to absorb the power output of either radio-frequency supply; the power of which supply is absorbed is dependent upon the switching state of the microwave switch. Likewise it is seen that only one microwave switch or control element is required to direct the power from either supply to the load while simultaneously, in cooperation with the isolator, assuring that the power output of the other supply is absorbed.

Moreover, by utilizing only three circuit components, only one of which is a control element, the switching circuit is much less subject to failue than any system it is designed to protect.

Another virtue of this switching circuit is that by avoiding the necessity of any synchronous switching of two or more control elements, the time constant of the circuit is very small and, thus, extremely rapid switching is possible.

The switching circuit is also "fail-safe" and prevents any possible "frequency pulling" of the normally used supply even though only three circuit components are utilized.

In one alternative embodiment, a four-branch circulator is employed with the fourth branch being terminated in a substantially reflectionless resistive termination matching the characteristic impedance of the load or system. Such an arrangement prevents "frequency pulling" of either radio-frequency supply in applications where this is important.

These and other objects, the nature of the present invention and its various features and advantages will appear more fully upon consideration of the specific illustrative embodiments shown in the accompanying drawing and as analyzed in the following detailed description of the drawing.

Figure 2:
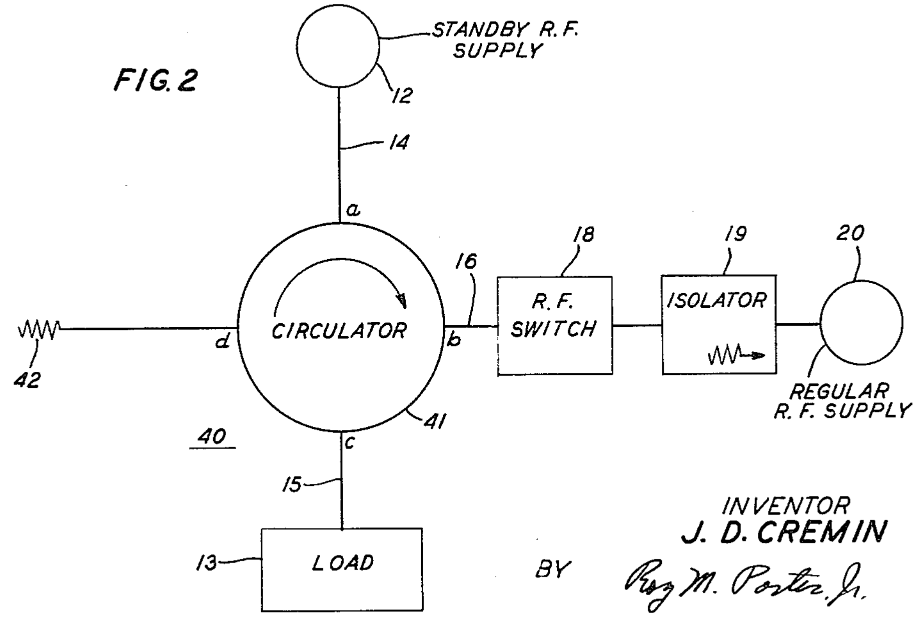

In the drawing:

FIG. 1 is a diagrammatic illustration of a microwave switching circuit embodying the principles of this invention; and FIG. 2 is a diagrammatic illustration of an alternative microwave switching circuit in accordance with the principles of this invention.

Referring now more particularly to FIG. 1, there is depicted a microwave switching circuit 10 comprising a three-branch circulator 11 with a first standby radio-frequency supply 12 and a usable load 13 connected to branches *a* and *c* thereof through waveguide sections 14 and 15, respectively. Connected in tandem to branch *b* of circulator 11 through a waveguide section 16 are a radio-frequency switch 18, an isolator 19 and a second regular radio-frequency supply 20. The switch 18 may comprise any one of a number of forms described in greater detail hereinafter. Whatever form switch 18 takes in accordance with the principles of this invention, it should exhibit a first normally reciprocally transparent (closed) state and a second reciprocally reflective (open) state when actuated in a suitable manner. For purposes of illustration only, a voltage source 22 with a simple single pole mechanical switch 23 is shown connected to the radio-frequency switch 18. It is to be understood, of course, that any one of a number of well known and commercial forms of logic and/or electronic switching circuitry may be employed to rapidly apply suitable bias to radio-frequency switches actuated by this expedient. It should also be understood that the mechanical switch 23 is only representative of control circuitry suitable to actuate the radio-frequency switch 18 in response to some control parameter of the regular or standby radio-frequency supplies indicative of malfunctioning, such as a loss of filament voltage or radio-frequency power output, for example. The dot-dash line 24 between the regular radio-frequency supply 20 and the mechanical switch 23 is shown to signify that there is normally an appropriate detection link therebetween to actuate switch 23 in response to some operating parameter of the supply 20 in a desired manner.

The isolator 19, as indicated by the arrowed resistor symbol, exhibits nonreciprocal attenuation in the direction from the radio-frequency switch 18 to the regular radio-frequency supply 20. As such, signal energy is freely transmitted through isolator 19 in the direction opposite to that of the arrow.

Before describing the operation of switching circuit 10, it perhaps would be advantageous to digress briefly, to discuss the functions of the component elements in somewhat greater detail as well as the various forms that they may take.

"Circulator," as the name implies, connotes a commutation of power from one transmission mode branch to one which follows in succession, all of the power either passing through a given branch or being reflected therefrom to the next succeeding branch, none of the power introduced at any branch of the circulator being absorbed therein. Such a circulator may take a number of different forms. The Faraday rotator type of circulator as disclosed in the patents of C. L. Hogan 2,748,353 and S. E. Miller 2,748,352, both issued May 29, 1959, has been generally preferred heretofore. However, circulators of the rectangular waveguide type utilizing nonreciprocal phase shift, nonreciprocal phase constants, field-displacement or ferrite loaded apertures as disclosed in an article entitled "Behavior and Applications of Ferrites in the Microwave Region" by A. G. Fox, S. E. Miller and M. T. Weiss, Bell System Technical Journal, volume 54, pages 5–103, January 1955, may similarly be utilized.

In all of these types of circulators, the electrical properties of ferrite are utilized to provide a multibranch, nonreciprocal waveguide network wherein the electrical energy introduced at one branch thereof is coupled to only the next succeeding branch. Thus, for example, in circulator 11, signal energy introduced at branch *a* passes to branch *b*, energy introduced at branch *b* passes to branch *c* and if energy were introduced at branch *c*, it would pass to branch *a*. For a more complete discussion of the various types of circulators, reference is made to the aforementioned article in the Bell System Technical Journal.

The radio-frequency switch 18 exhibiting alternately reciprocally transparent and reflective states is preferably of the ferrite type utilizing the Faraday rotation principle as disclosed in both the aforementioned Bell System Technical Journal article and in a more refined form in an article entitled "Faraday Rotation Switch for the TH System" by J. A. Weiss, Bell Laboratories Record, April 1959, pages 139–144. Described briefly, a section of circular waveguide containing a ferrite rod axially mounted therein is connected between two sections of a transmission line comprised of rectangular waveguide, the two sections being oriented at 90 degrees with respect to each other as utilized in accordance with the principles of this invention. A longitudinal direct-current magnetic field is applied to the ferrite rod by an external solenoid. In operation, a linearly polarized wave is made to interact with the ferrite rod. With the ferrite rod magnetized, the direction of polarization of the wave is rotated, the total angle of rotation being determined by what fraction of the wave penetrates the ferrite, by the length of the interaction region and by the magnetic state of the ferrite.

As operated in the present invention, such a switch would normally be in the reciprocally transparent (closed) state when there is a direct-current field applied thereto. In this condition, the polarization of the incident radiation introduced at either end of the switch would be rotated and arrive at the opposite output end of the switch oriented at 90 degrees with respect to its initial polarization and, thus, be freely transmitted into the mutually oriented output wave guide section.

Conversely, when there is no direct-current field applied to the switch, the polarization of the incident radiation introduced at either end of the switch would not be rotated and, therefore, would arrive at the opposite output end oriented at 90 degrees with respect to the polarization required for propagation through the output waveguide section.

More specifically, in this polarization, the radiated enenergy would interact with the two broad faces of the particular output guide whose spacing is only one-half that of the narrow faces. Since this spacing is less than the one-half wavelength cutoff dimension, the radiation is fully reflected. On the return trip, the wave arrives at the input end with its original polarization unchanged and is, therefore, freely transmitted back into the input rectangular guide section. Thus, in the "open" state, the switch as utilized in circuit 10 would reflect energy introduced from either direction.

It is to be understood that other forms of radio-frequency switches could also be utilized in accordance with the invention. For example, ferrite switches of the rectangular waveguide type utilizing suitably positioned ferrite magnetized in a direction transverse to the direction of wave propagation may be made to exhibit reciprocally reflective and transparent states, as disclosed in a copending application of Seidel-Weiss, now United States Patent 2,989,709, issued June 20, 1961.

Similarly, as is known in the art, for switching small amounts of radio-frequency power, semiconductor diodes properly positioned and biased within a rectangular waveguide may be utilized as fast-acting radio-frequency switches exhibiting reciprocally reflective and transparent states.

With a number of different types of radio-frequency switches being adaptable for use in accordance with the principles of this invention, it is to be understood that such radio-frequency switch could be positioned within the waveguide branches of the circulator rather than in the section of waveguide intermediate the circulator and the isolator as depicted in FIG. 1. Therefore, in the following description as well as in the appended claims, when a component is described as included in a "waveguide section" connected to a branch of a circulator, it is to be understood that this "waveguide section" includes also the physical waveguide arms of a circulator as sold commercially. Thus, the term "branch" refers to the electrical junction within the circulator and not necessarily to the physical arm or to the flange or to other physical terminations at the end of this arm.

The isolator 19 also generally utilizes the electrical properties of ferrite and, as disclosed in the aforementioned Bell System Technical Journal article, may depend for operation on the Faraday rotation principle in round guides or, in rectangular guides, may depend for operation on the principles of ferromagnetic resonance or field-displacement in combination with a resistance sheet or slotted wall. In any event, the isolator exhibits the unique property that it can transmit energy freely in one direction and absorb energy completely in the opposite direction. As will present be seen, this operating property of an isolator, when properly used in combination with the characteristics of the aforementioned types of switches, can serve a dual role for two different supplies of radio-frequency energy in a selective manner.

Operation of switching circuit 10 will now be described with reference to its use as a protective circuit for use in a microwave system utilizing a standby carrier supply. It is to be understood, of course, that switching circuit 10 has application in any system where it is desired to switch rapidly energy from either of two radio-frequency supplies to a common load while simultaneously absorbing the energy of the other supply.

In considering the normal mode of operation with radio-frequency energy being fed to the load 13 from the regular supply 20, reference will be made to the various paths of transmission or of energy flow as indicated by the dotted and solid lines with arrows in FIG. 1. More specifically, the dotted lines with arrows indicate the respective paths of energy flow from the regular and standby supplies when the radio-frequency switch 18 is in its normally reciprocally transparent state whereas the solid lines with arrows indicate the respecctive path of energy flow for the same supplies when the radio-frequency switch is in the reciprocally reflective state. As seen from FIG. 1, energy from the standby supply 12 enters branch *a* of circulator 11 and is transmitted nonreciprocally in the direction of the arrow to branch *b* thereof. At branch *b* the energy from the standby supply is transmitted through radio-frequency switch 18 (which normally is in a reciprocally transparent state) to the isolator 19 and absorbed therein. During this same time, radio-frequency energy from the regular supply 20 is directed through both the isolator 19, in the direction of minimum attenuation, and also through switch 18 to branch *b* of circulator 11. The energy is then directed to branch *c* of the circulator at which point it is transmitted to the load 13 for utilization.

Assume now that the alternate condition is desired, i.e., the condition wherein it is desired to direct energy from the standby supply 12 to the load 13, such as when the regular supply 20 is malfunctioning, for example. To accomplish this result radio-frequency switch 18 must be suitably actuated. If it is assumed, for purposes of illustration, that radio-frequency switch 18 is a ferrite switch utilizing the Faraday rotation principle, the predetermined value of a direct-current voltage normally applied to this switch, such as through the battery source 22 and direct-current switch 23, is removed. This will result in the operating characteristics of the switch being changed from a normally reciprocally transparent state to a reciprocally reflective state. In this event, the direction of energy flow from supplies 12 and 20 through circuit 10 in FIG. 1 is readily seen from the solid lines with arrows. Specifically, it is seen that the radio-frequency energy from the standby supply 12 is transmitted to branch *a* of circulator 11, continues to branch *b* thereof and then is reflected by switch 18 back to branch *b* of circulator 11 and ultimately appears at the load 13 for utilization. Concurrently therewith, energy from the regular supply 20 passes freely through the isolator 19, and is reflected by radio-frequency switch 18 back to the isolator 19 for absorption therein.

It is thus seen that switching circuit 10 is unique in comprising only three circuit elements, namely, the circulator 11, radio-frequency switch 18 and isolator 19 for selectively switching either of energy supplies 12 or 20 to a common load 13 while simultaneously absorbing the energy of the other supply in a common dummy load comprising the isolator 19.

Moreover, the feature of switching circuit 10 in utilizing only one control element, namely, the single radio-frequency switch 18, reduces the chances of malfunction of the composite circuit as compared with prior art arrangements requiring four or more elements. Switching circuit 10 also effects a marked reduction in switching time from that realized with prior art arrangements by eliminating the need for synchronous switching of two or more control elements and by keeping the total effective inductive portion of the time constant of the circuit to a minimum. A collateral advantage of circuit 10 is that if radio-frequency switch 18 is inoperative for any reason, it can be removed by simply inserting a suitable reflective shutter on the circulator side of the switch without in any way disrupting the path of energy flow between the standby supply 12 and the load 13. In addition, switching circuit 10 is "fail-safe" in that failure of control current to the single switch element will result in an immediate circuit change connecting the standby rather than the regular radio-frequency supply to the load.

In certain systems applications where an oscillator is connected to a load or antenna through a long transmission line section, for example, "frequency-pulling" of the oscillator by the "long-line effect" sometimes proves troublesome. Such a detrimental effect can be substantially reduced by the use of an isolator positioned between the oscillator and the long line. This greatly improves the linearity of frequency modulation which can be obtained with klystrons, for example. If the impedance of the isolator as seen from the load or antenna side is a better match than the oscillator itself, then echoes will be reduced which could otherwise be multiply reflected between the oscillator and the load or antenna before finally being propagated or radiated as the case may be.

Such frequency-pulling with respect to radio-frequency supply 20 is substantially eliminated in switching circuit 10 by isolator 19. However, the "long-line effect" between branch *c* of circulator 11 and the load 13 in certain situations could prove detrimental with respect to frequency-pulling of radio-frequency supply 12. To eliminate this possible effect, FIG. 2 depicts a switching circuit 40 which utilizes a four-branch circulator 41 with the fourth branch *d* being terminated in a substantially reflectionless dissipative termination 42 closely matching that of the load 13. With this arrangement only one isolator and one simple resistive termination are required to prevent frequency-pulling of either radio-frequency supplies 12 or 20. In other respects, switching circuit 40 is identical to switching circuit 10 of FIG. 1 and, therefore, the various other circuit elements of circuit 40 which correspond to those of circuit 10 in FIG. 1 are identified by the same reference numerals.

It is to be understood that the specific embodiments described herein are merely illustrative of the general principles of the instant invention. Numerous other structural arrangements and modifications may be devised in the light of this diclosure by those skilled in the art without departing from the spirit and scope of this invention.

What is claimed is:

1. A high speed microwave switching circuit for connecting first and second radio-frequency supplies alternately to a common load while simultaneously absorbing the energy of the other supply, said circuit comprising a multibranch circulator with said first and second supplies and a usable load connected respectively to different branches thereof, an isolator interposed between said circulator and said second supply and exhibiting nonreciprocal attenuation in the direction from said circulator to said second supply, and means interposed between said circulator and said isolator and having a first reciprocally transparent state for directing energy from said second supply to said load while simultaneously directing energy from said first supply to said isolator for absorption therein, said means having an alternate reciprocally reflective state for directing energy from said second supply back to said isolator for absorption therein while simultaneously directing energy from said first supply to said load.

2. A high speed microwave switching circuit in accordance with claim 1 wherein said means interposed between said circulator and said isolator comprises a radio-frequency switch actuated to be reciprocally transparent to the propagation of wave energy therethrough by a direct-current biasing voltage selectively applied thereto.

3. A high speed microwave switching circuit in accordance with claim 1 further comprising a fourth branch terminated in a substantially reflectionless dissipative termination for absorbing any energy passing from said branch connected to said load to said branch connected to said first radio-frequency supply.

4. A high speed microwave switching circuit for connecting first and second radio-frequency supplies alternately to a common load while simultaneously absorbing the energy of the other supply, said circuit comprising a four-branch circulator with said first and second supplies and a usable load connected respectively to the first three branches thereof, said fourth branch being terminated in a substantially reflectionless dissipative termination matching the characteristic impedance of said load, an isolator interposed between said circulator and said second supply and exhibiting nonreciprocal attenuation in the direction from said circulator to said second supply, and a two-state radio-frequency switching means actuated by a biasing voltage selectively applied thereto interposed between said circulator and said isolator, said switching means having a first normally reciprocally transmitting state for directing energy from said second supply to said load while simultaneously directing energy from said first supply to said isolator for absorption therein and an alternate reciprocally reflective state in response to an appropriate change in said biasing voltage applied thereto for directing energy from said second supply back to said isolator for absorption therein while simultaneously directing energy from said first supply to said load.

5. A high speed microwave switching circuit for connecting first and second radio-frequency supplies alternately to a common load while simultaneously absorbing the energy of the other supply, said circuit comprising a multibranch microwave network with said first and second supplies and a usable load connected respectively to different branches thereof, each individual branch of said network being coupled with the next preceding branch for unidirective wave energy conduction from said preceding branch toward said individual branch and with the next succeeding branch thereof for unidirective wave energy conduction from said individual branch toward said succeeding branch, first means interposed between said microwave network and said second supply for providing nonreciprocal attenuation in the direction from said network to said second supply, and second means interposed between said microwave network and said first means and having a first reciprocally transparent state for directing energy from said second supply to said load while simultaneously directing energy from said first supply to said first means for absorption therein, said second means having an alternate reciprocally reflective state for directing energy from said second supply back to said first means for absorption therein while simultaneously directing energy from said first supply to said load.

6. A high speed microwave switching circuit in accordance with claim 5 wherein said multibranch network comprises a circulator and said first means comprises an isolator.

7. A high speed microwave switching circuit in accordance with claim 5 wherein said second means comprises a radio-frequency switch actuated to be reciprocally transparent to the propagation of wave energy therethrough by a direct-current biasing voltage selectively applied thereto.

References Cited in the file of this patent

UNITED STATES PATENTS 2,973,512 Walsh ---------------- Feb. 28, 1961